US012521727B2

(12) United States Patent
Chen et al.

(10) Patent No.: US 12,521,727 B2
(45) Date of Patent: Jan. 13, 2026

(54) HIGH-PRESSURE JET IMPACT CHAMBER STRUCTURE AND MULTI-PARALLEL TYPE PULVERIZING COMPONENT

(71) Applicants: NANCHANG UNIVERSITY, Nanchang (CN); International Institute Of Food Innovation Co., Ltd., Nanchang University, Jiangxi, China, Nanchang (CN)

(72) Inventors: Jun Chen, Nanchang (CN); Jialong Han, Nanchang (CN); Taotao Dai, Nanchang (CN); Lizhen Deng, Nanchang (CN); Chengmei Liu, Nanchang (CN); Wei Liu, Nanchang (CN); Ruihong Liang, Nanchang (CN)

(73) Assignees: NANCHANG UNIVERSITY, Nanchang (CN); INTERNATIONAL INSTITUTE OF FOOD INNOVATION CO., LTD., NANCHANG UNIVERSITY, JIANGXI, CHINA, Nanchang (CN)

( * ) Notice: Subject to any disclaimer, the term of this patent is extended or adjusted under 35 U.S.C. 154(b) by 312 days.

(21) Appl. No.: 18/501,008

(22) Filed: Nov. 2, 2023

(65) Prior Publication Data

US 2025/0144640 A1 May 8, 2025

(51) Int. Cl.
*B02C 19/06* (2006.01)

(52) U.S. Cl.
CPC .................................. *B02C 19/066* (2013.01)

(58) Field of Classification Search
CPC ...... B02C 19/06; B02C 19/061; B02C 19/066
See application file for complete search history.

(56) References Cited

U.S. PATENT DOCUMENTS 2,487,088 A * 11/1949 Andrews ............... B02C 19/066 241/5
7,866,581 B2 * 1/2011 Omatsu ................. B02C 19/066 241/5

FOREIGN PATENT DOCUMENTS

CN 109590095 A * 4/2019 ............. B02C 19/06
CN 109642191 A * 4/2019 ............. C12C 7/042
CN 209438771 U * 9/2019
EP 1410846 A1 * 4/2004 ............. B05B 15/14
UA 78701 C2 * 4/2007

OTHER PUBLICATIONS

Translation of CN-209438771.*

(Continued)

*Primary Examiner* — Bobby Yeonjin Kim

(57) ABSTRACT

Provided are a high-pressure jet impact chamber structure, with an industrial-grade "single orifice+single pulverizing chamber" design, and a multi-parallel type convenient pulverizing component adopted with the high-pressure jet impact chamber structure. The high-pressure jet impact chamber structure includes a body, a jet orifice, and a pulverizing chamber. The multi-parallel type convenient pulverizing component adopted with the high-pressure jet impact chamber structure includes a multi-parallel type chassis, a multi-parallel type connector disk, multiple high-pressure jet impact chamber structures that are parallel to each other, a sealing end cover, a discharge disk, and a discharge pipe.

14 Claims, 4 Drawing Sheets

Cross-section C-C

(56) References Cited

OTHER PUBLICATIONS

Translation of CN-109642191.*
Translation of CN-109590095.*
Translation of UA-78701.*
Translation of EP-1410846.*

* cited by examiner

Cross-section C-C

HIGH-PRESSURE JET IMPACT CHAMBER STRUCTURE AND MULTI-PARALLEL TYPE PULVERIZING COMPONENT

TECHNICAL FIELD

The present disclosure belongs to the technical field of ultra-micro pulverization, and in particular to a high-pressure jet impact chamber structure and a multi-parallel type pulverizing component.

BACKGROUND

Dynamic high-pressure microfluidizer (also an industry-scale microfluidizer, a jet mill system) is an emerging high-pressure homogeneous physical processing means, of which the working principle is mainly through a plunger high-pressure pump to provide high-pressure (up to 180 MPa), through a channel conveying fluid in the jet impact chamber to introduce liquid material containing solid particles into a specially designed chamber channel, and the resulting high-energy jet occurs in the channel with high-speed wall impact and high-frequency mixing. The high-speed wall impact induces solid particles to be crushed and refined, and the high-frequency mixing produces a high-energy turbulence field that produces homogenization and emulsification.

The dynamic high-pressure microfluidizer compared to conventional pulverizing equipment (such as media mill, ball mill, colloid mill, etc.) has more excellent pulverizing effect, and can be applied mainly in the field of food, pharmaceuticals, coatings, chemicals, etc. Especially in the field of food processing, the dynamic high-pressure microfluidizer can achieve ultra-fine crushing and multi-component food homogeneous emulsification effect upon food materials (including bran, seeds, fibers, dregs, etc.), to achieve the material particle size of micron level. However, due to the use of the equipment in the field of food, the choice of the range of equipment materials is also limited.

In the dynamic high-pressure microfluidizer, the jet impact chamber is the core component of the system. A traditional jet impact chamber has small processing capacity, which cannot meet the needs of industrial production (such as Microfluidic® M-110P, M-110EH, and M-110Y models with micro-jet maximum processing capacity of only 7.2, 27, and 30 L/h, respectively), and easy to be worn by the fluid, being a consumable part. Under normal working conditions, the conventional jet impact chamber is required to be replaced after processing about 50 t of fluid, and the dismantling process is complicated and cumbersome, which delays the production progress of the factory.

At present, the jet impact chamber of the dynamic high-pressure microfluidizer is usually adopted with two grinding chambers, which are connected through a micro-aperture channel. Related art (CN Patent Application No.: 202011281465.0, disclosing a jet impact milling device and a method for whole-component pulping of food) discloses a method for designing a micro-aperture channel nozzle, including a shell, a first jet chamber, a second jet chamber, a first collision wall, a second collision wall, a micro-aperture channel, and a support foot, which is a cumbersome design process that does not facilitate mass production of the micro-aperture channel nozzle; further, the inner diameters of the first jet chamber, the second jet chamber, and the micro-aperture channel are in a micron level, therefore, the processing rate is low and the material is easy to be clogged, which seriously restricts the industrialized application.

In addition, the dynamic high-pressure microfluidizer is mainly adopted with a single high-pressure jet impact chamber for crushing, which has low working efficiency and slows down the industrial production rate. In recent years, some literatures consider using multiple high-pressure jet impact chambers for crushing at the same time, but there are problems such as cumbersome installation steps and incomplete crushing of solid particles resulting in wide particle size distribution. Related art (CN Patent Application No.: 201811461722.1, disclosing a high-pressure jet nozzle and a high-pressure jet pulverizing device applying the nozzle) discloses the use of an overall structural processing method for connecting the nozzle, but the method is complicated in process, troublesome in assembling and disassembling, and difficult to realize the replacement of a single nozzle. In addition, the pulverized material has a wide distribution, and parts of sealing materials in direct contact with the material are made of copper ring, PTFE ring, rubber ring, PEEK ring etc., which limits the application field of this device.

SUMMARY OF THE DISCLOSURE

To achieve the above purpose, the present disclosure provides a high-pressure jet impact chamber structure, including a body; wherein both ends of the body along a length direction are an upstream end and a downstream end; an opening of the upstream end is configured to connect a supply portion, and an opening of the downstream end is configured to connect a discharge portion; a chamber is defined in the body extending along the length direction and running through the upstream end and the downstream end; the chamber includes a jet aperture disposed at the upstream end and a pulverizing chamber disposed at the downstream end that are in communication with each other; a flow size of the jet aperture is the same as or smaller than a flow size of the pulverizing chamber; the pulverizing chamber includes a first inlet disposed at the upstream end and a first outlet disposed at the downstream end; a flow size of the pulverizing chamber increases sequentially from the first inlet to the first outlet; an inner wall surface of the pulverizing chamber is formed with a pulverizing portion for pulverizing.

In some embodiments, the pulverizing chamber is of a rotary structure; the pulverizing portion includes a plurality of protruding conical surfaces formed from the first inlet to the first outlet; a section of the pulverizing chamber is serrated, and a chamfer is arranged at each of the first inlet and the first outlet.

In some embodiments, the jet orifice has a circular cross-section and has an inner diameter of 6-16 mm.

In some embodiments, the pulverizing chamber has an inner diameter of 6-16 mm.

In some embodiments, an axis of the jet orifice is located in a same line with an axis of the pulverizing chamber.

In some embodiments, the body is arranged with a first external thread on an outer side wall adjacent to the upstream end and with a second external thread on an outer side wall adjacent to the downstream end.

In some embodiments, the body is made of 304 stainless steel, and the pulverizing portion is made of diamond.

The present disclosure further provides a multi-parallel type convenient pulverizing component, including a plurality of the high-pressure jet impact chamber structures as above, and the supply portion and the discharge portion; wherein the supply portion has a supply chamber, the supply chamber being connected to an opening at the upstream end of each high-pressure jet impact chamber structure; the discharge portion has a discharge chamber, the discharge chamber being connected to an opening at the downstream end of each high pressure jet impact chamber structure.

In some embodiments, the supply portion includes a multi-parallel type chassis and a multi-parallel type connector disk that are docked together to enclose the supply chamber; the multi-parallel type connector disk defines a plurality of though holes, and a number of the plurality of though holes is the same as a number of the plurality of high-pressure jet impact chamber structures; the plurality of though holes are in communication with the supply chamber and with the openings at the upstream ends of the plurality of high-pressure jet impact chamber structures; the multi-parallel type chassis defines a docking hole in communication with the supply chamber and to a supply pipe; an end of the feed pipe away from the docking hole is connected to a high-pressure pump output pipe; the discharge portion includes a sealing end cover and a discharge disk that are sealed and docked to each other to enclose the discharge chamber; the sealing end cover defines a plurality of through holes, and a number of the plurality of though holes is the same as a number of the plurality of high-pressure jet impact chamber structures; the plurality of though holes are in communication with the discharge chamber and with the openings at the downstream ends of the plurality of high-pressure jet impact chamber structures; the discharge disk defines a perforation, and an inner diameter of the perforation is the same as an inner diameter of the discharge chamber; the perforation is connected to a discharge pipe.

In some embodiments, the discharge pipe is in a shape of a circular terrace with two ends of different diameters; one of the two ends with a greater diameter is docked to the perforation.

The high-pressure jet impact chamber structure and multi-parallel type convenient pulverizing component provided by the present disclosure have the following technical effects.

(1) Aiming at the problems for traditional jet impact chambers with small processing capacity and easy to clog, the proposed device is improved from two aspects, i.e., increasing the diameters of the jet orifice and the pulverizing chamber in the jet impact chamber, and enhancing the pressure of the high-pressure pump. The diameters of the jet orifice and the pulverizing chamber in the jet impact chamber are of millimeters, and a single jet impact chamber processing capacity (up to 1200 L/h) is large; by enhancing the pressure of the high-pressure pump to generate high pressure (up to 180 MPa), the kinetic energy of the multiphase fluid is increased, improving the production efficiency to meet the continuous production of the industrial-grade dynamic high-pressure microfluidizer.

(2) The device effectively improves the pulverizing effect of materials, and the pulverized materials are up to micron level and particle size distribution is narrow. The jet impact chamber is adopted with an "single orifice+single pulverizing chamber" design, the internal wall of the jet orifice is smooth, and the pulverizing chamber consists of several protruding conical surfaces. When high-speed fluid containing solid particles passes through the jet orifice into the pulverizing chamber, the solid particles impact with walls to be broken. The protruding conical surface increases the impact efficiency between solid particles and solid particles, and the multiphase fluid produces shock and cavitation effect in the jet impact chamber, plays the role of emulsification and homogenization, and continues to gush out in the direction of the exit. The design process of the jet impact chamber is simple and convenient and is easy to batch production.

(3) The device can withstand the impact of high-pressure fluid and is not easy to wear, the body is made of 304 stainless steel, and the pulverizing chamber is made of diamond material, such that the overall hardness is ensured to enhance the service life of the chamber. A single chamber can handle at least 5,000 tons of fluid. The chamber is made of food-grade materials, which can be used directly in contact with food materials. The newly designed the multi-parallel type chassis and connector plate can match the high-pressure jet impact chamber, allowing the installation of two or more high-pressure jet impact chambers. In addition, the modular design is adopted, and the whole unit can be replaced by removing the bolts at the connector disk and the sealing end cover. Similarly, a single nozzle in the parallel-type jet impact nozzle can be replaced, and the replacement and assembly process is quick and easy.

In summary, the high-pressure jet impact chamber is adopted with an "single orifice+single pulverizing chamber" design, which is conducive to jet impact, shock, and cavitation for the multi-phase fluid containing solid particles in the pulverizing chamber, such that the particulate material is ultra-micro pulverized by ultra-high-density energy. In addition, the diameters of the pulverizing chamber and the jet orifice are greater than that of the cavity of the conventional micro-jet device, which effectively solves the problems of the orifice being easy to block and small processing capacity. The use of the parallel-type jet impact nozzle not only improves the processing efficiency of the device, but also makes the particle size of the crushed material uniform.

DETAILED DESCRIPTION

In order to make the technical problems, technical solutions, and beneficial effects to be solved by the present disclosure clearer and more understandable, the present disclosure is described in further detail hereinafter in connection with the embodiments and the accompanying drawings. It should be understood that the specific embodiments described herein are only for the purpose of explaining the present disclosure and are not intended to limit the present disclosure.

Figure 1:
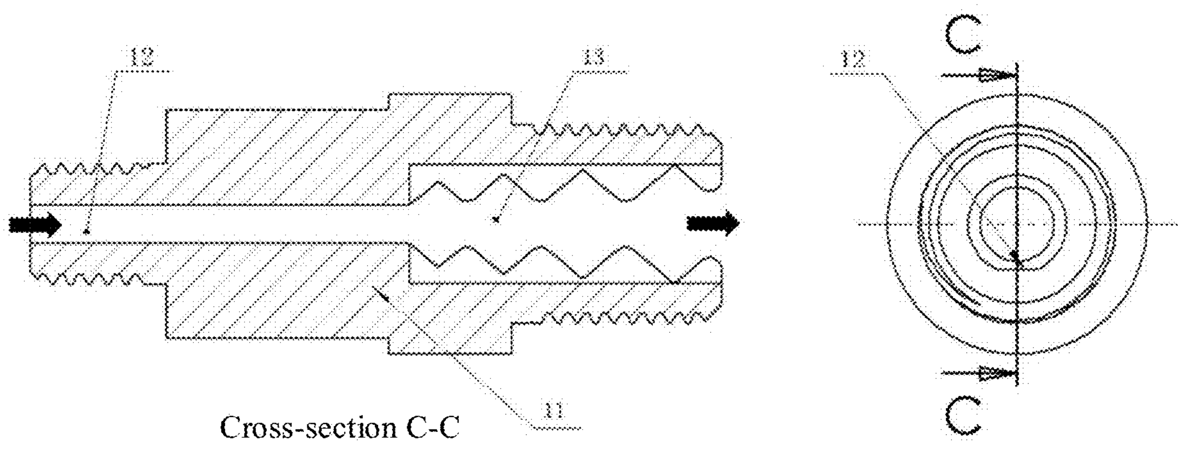
FIG. 1 is a structural schematic view of a high-pressure jet impact chamber structure, with an industrial-grade "single orifice+single pulverizing chamber" design, provided in the present disclosure; where: 11—body, 12—jet orifice, 13—pulverizing chamber.

As shown in FIG. 1, FIG. 1 is a structural schematic view of a high-pressure jet impact chamber structure 17, with an industrial-grade "single orifice+single pulverizing chamber" design, provided in the present disclosure, including a body 11, a jet orifice 12, and a pulverizing chamber 13. An upstream end and a downstream end of the body 11 may be rounded end surfaces, and both the rounded end surfaces are each arranged with a sealing ring to enhance the sealing effect, and with external threads, i.e., a first external thread and a second external thread, respectively; the upstream end is configured to be connected to a multi-parallel type connector disk 16, and the downstream end is configured to be connected to a sealing end cover 18; the jet orifice 12 is a cylindrical structure, that is, its cross-section is circular, with the inner diameter of 6-16 mm, the internal wall is smooth, and an end of the jet orifice 12 is connected to the pulverizing chamber 13; the pulverizing chamber 13 is a rotary structure, with the inner diameter of 6-16 mm, and the section is serrated; a chamfer is designed at each of an inlet and an outlet of the pulverizing chamber 13; the pulverizing chamber 13 is formed with multiple protruding conical surfaces from the inlet to the outlet, and the inner diameter sequentially increases from the inlet to the outlet; the inner diameter of the jet orifice 12 is always less than or equal to the inner diameter of the pulverizing chamber 13, and the axis of the jet orifice 12 is located in a same line with the axis of the pulverizing chamber 13; the body 11 is made of 304 stainless steel, a pulverizing portion of the pulverizing chamber 13 is made of diamond.

Figure 2:
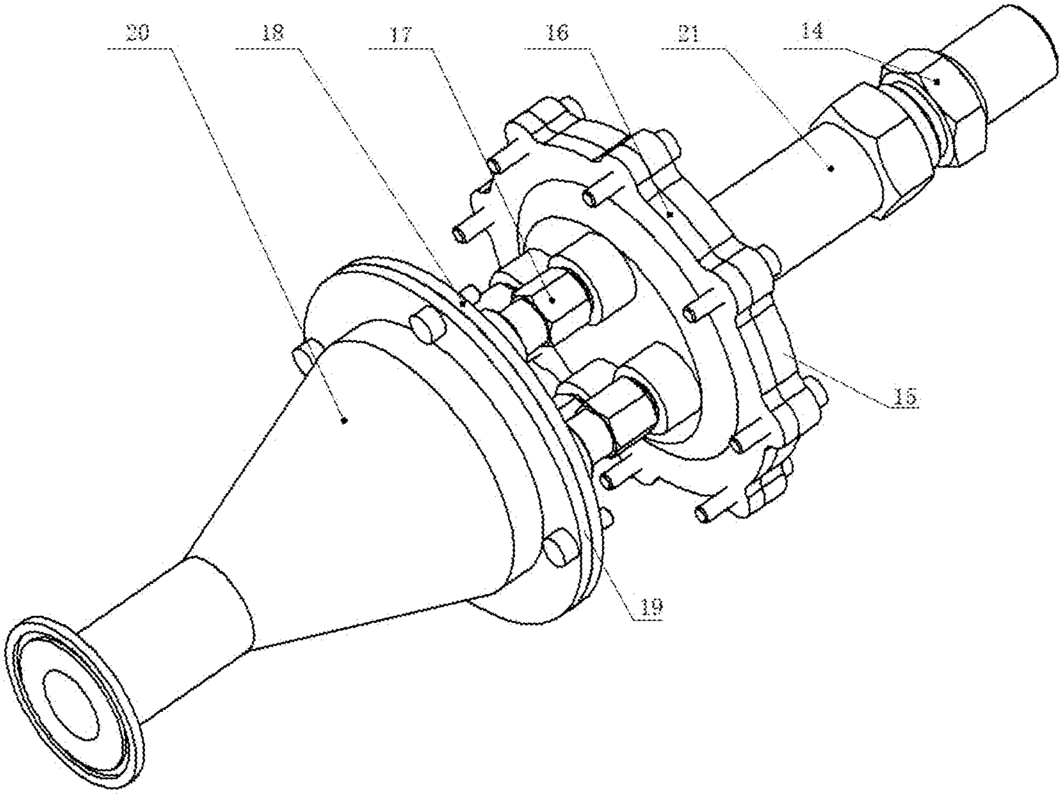
FIG. 2 is a structural schematic view of a multi-parallel type convenient pulverizing component adopted with the high-pressure jet impact chamber structure; where: 14—high-pressure pump output pipe, 15—multi-parallel type chassis, 16—multi-parallel type connector disk, 17—high-pressure jet impact chamber structure, 18—sealing end cover, 19—discharge disk, 20—discharge pipe, 21—supply pipe.

As shown in FIG. 2, FIG. 2 is a structural schematic view of a multi-parallel type convenient pulverizing component adopted with the high-pressure jet impact chamber structure 17, where the number of the high-pressure jet impact chamber structures 17 is at least two. The pulverizing component further includes a multi-parallel type chassis 15, a multi-parallel type connector disk 16, a sealing end cover 18, and a discharge disk 19. An upper end of the multi-parallel type chassis 15 is connected to a high-pressure pump output pipe of the industrial-grade dynamic high-pressure microfluidizer through a thread; the cross-sectional area of an inlet of the multi-parallel connector disk 16 is larger than the sum of the cross-sectional areas of the jet orifices 12 of all the jet impact chamber structures; the discharge pipe 20 is in the shape of a circular terrace; the discharge disk 19 is connected to the sealing end cover 18 by bolts; the diameter of a low-pressure outlet at the discharge pipe 20 is 12-40 mm, which depends on the number of the parallel chambers.

Figure 3:
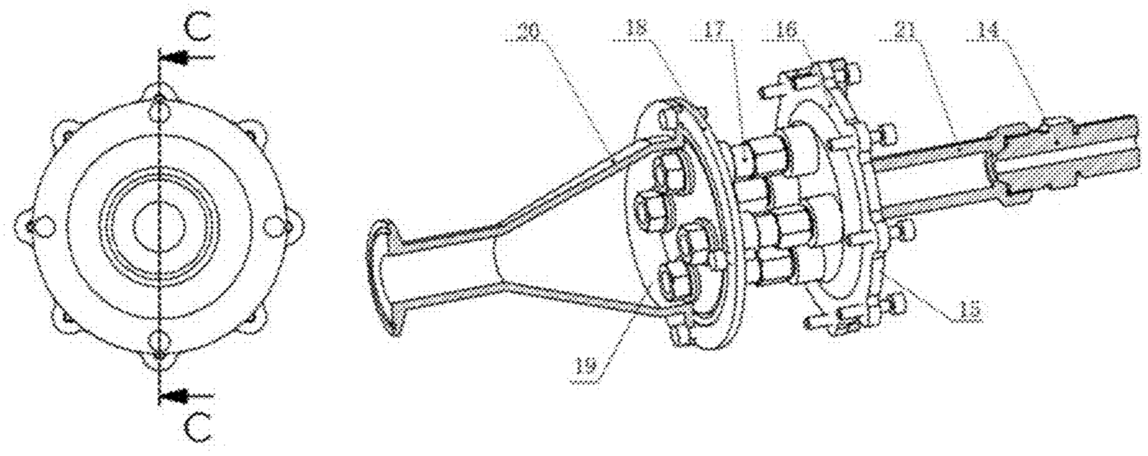
FIG. 3 is a partial sectional view of the multi-parallel type convenient pulverizing component adopted with the jet impact chamber structure.

As shown in FIG. 3, FIG. 3 is a partial sectional view of the multi-parallel type convenient pulverizing component adopted with the high-pressure jet impact chamber structure 17. The axes of the high-pressure jet impact chamber structures 17 and the axes of the multi-parallel type chassis 15, the multi-parallel type connector disk 16, the sealing end cover 18, and the discharge disk 19 are all distributed parallel to each other.

Figure 4:
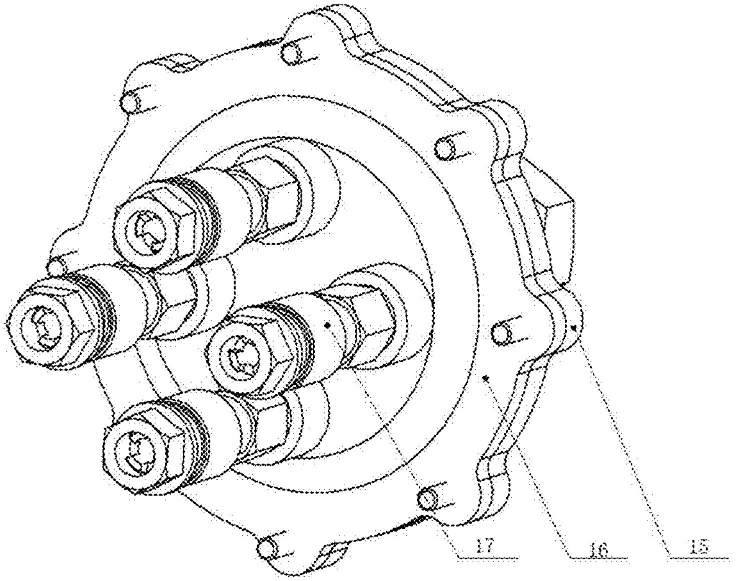
FIG. 4 is a schematic view where the high-pressure jet impact chamber structure is connected to the multi-parallel type connector disk.

As shown in FIG. 4, FIG. 4 is a schematic view where the high-pressure jet impact chamber structure 17 is connected to the multi-parallel type connector disk 16. An end surface of the jet orifice 12 is bolted to the multi-parallel type connector disk 16, and an end surface of the pulverizing chamber 13 is bolted to the sealing end cover 18; all of the high-pressure jet impact chamber structures 17 has axes parallel to each other. The two or more high-pressure jet impact chamber structures 17 may be distributed in a matrix, linear, circular, or other arbitrary form between the multi-parallel type connector disk 16 and the sealing end cover 18.

Figure 5:
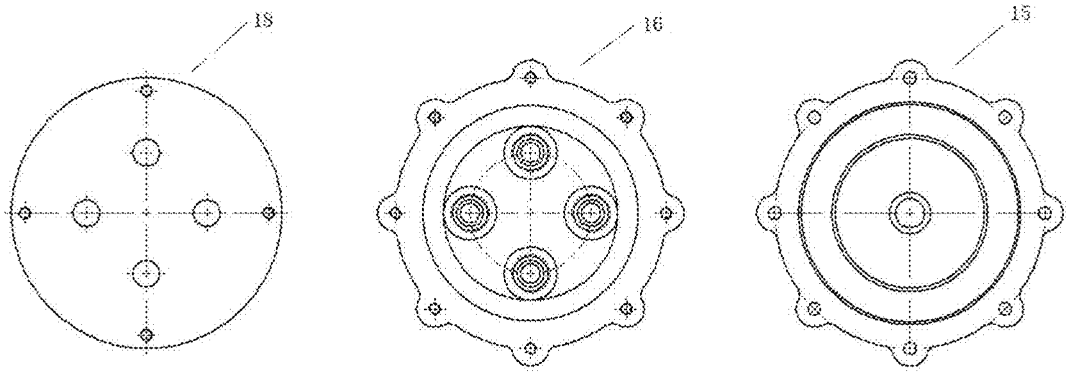
FIG. 5 is a schematic view of the sealing end cover, the multi-parallel type connector disk, and the multi-parallel type chassis.
Figure 6:
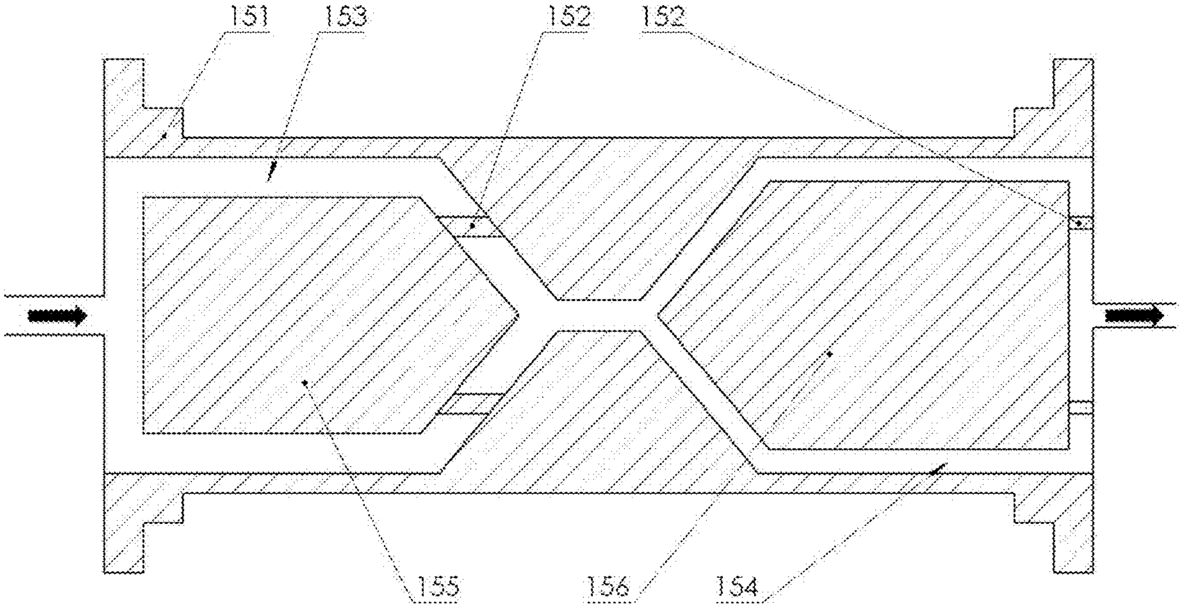
FIG. 6 shows a design of a jet impact chamber in Comparative Example 2; where: 151—housing, 152—support foot, 153—first jet chamber, 154—second jet chamber, 155—first collision wall, 156—second collision wall.
Figure 7:
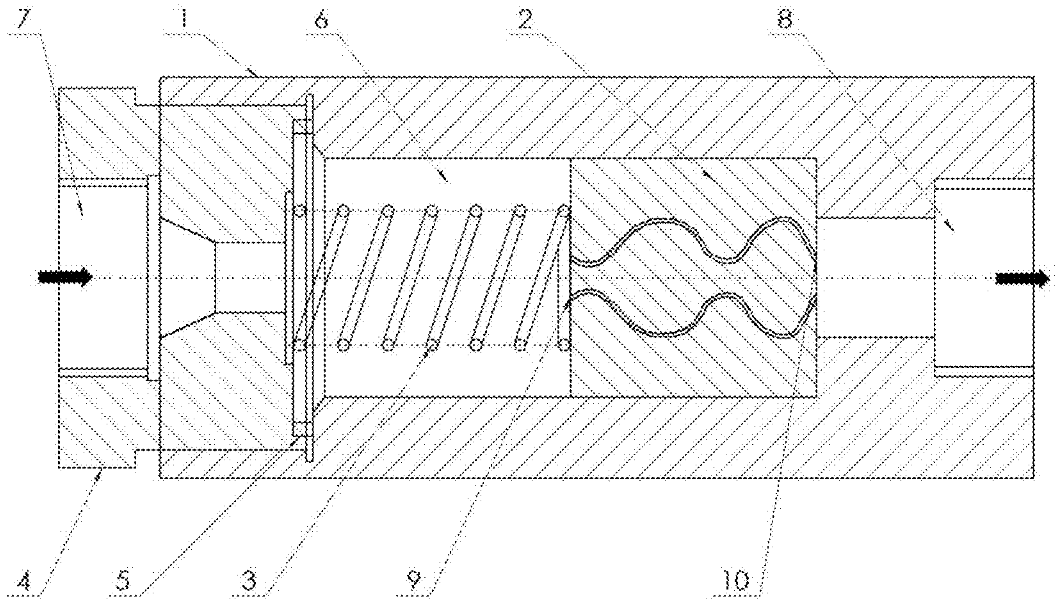
FIG. 7 shows a design of a jet impact chamber in Comparative Example 3; where: 1—housing, 2—jet channel component, 3—elastic component, 4—sealing cover, 5—sealing ring, 6—buffer chamber, 7—first inlet port, 8—first outlet port, 9—second inlet port, 10—second outlet port.

As shown in FIG. 5, FIG. 5 is a schematic view of the sealing end cover 18, the multi-parallel type connector disk 16, and the multi-parallel type chassis 15. The diameters of the multi-parallel type connector disk 16 and the sealing end cover 18 may be freely designed to allow the simultaneous assembly of the two and more high-pressure jet impact chamber structures 17 therebetween. The multi-parallel type chassis 15, the multi-parallel type connector disk 16, the sealing end cover 18, and the discharge disk 19 are all connected by bolts, and the end surfaces of the above components that need to be sealed are arranged with sealing rings to enhance the sealing effect.

Figure 8:
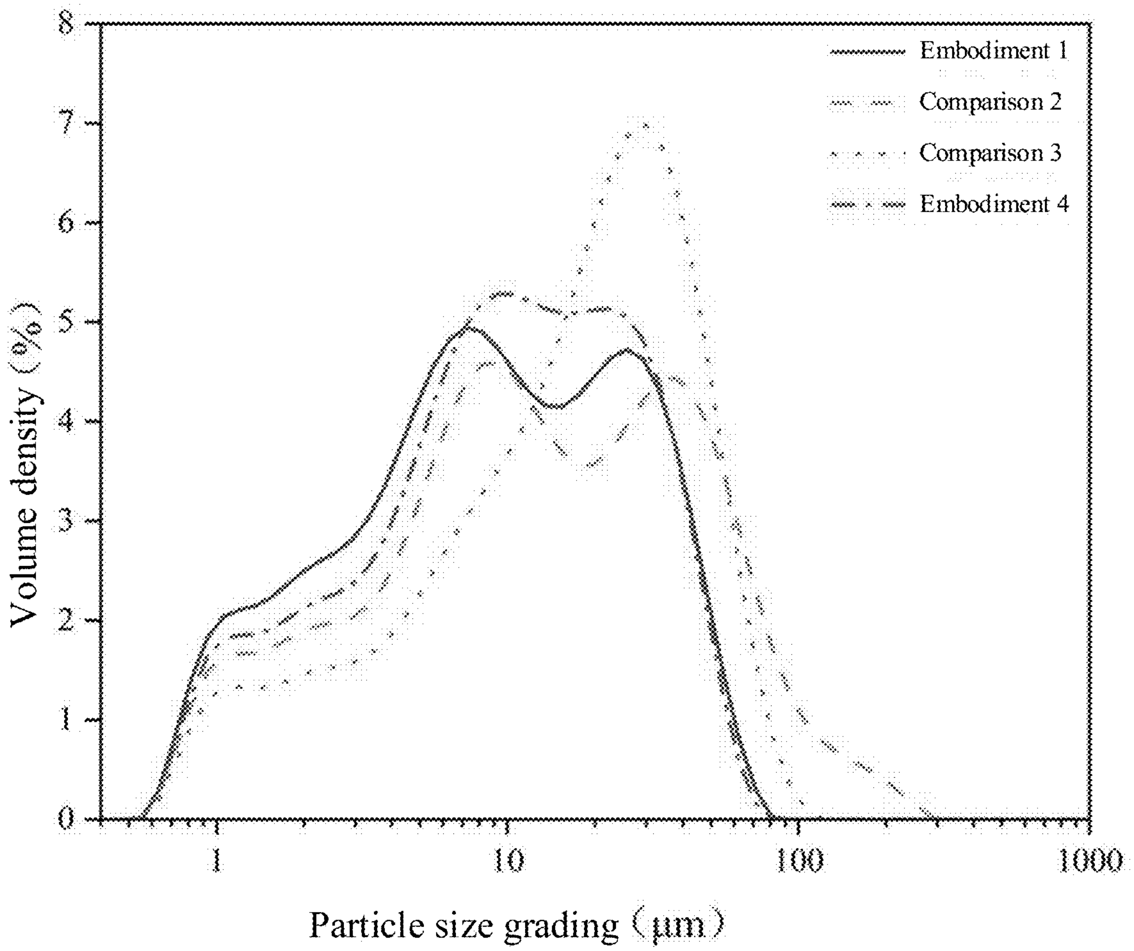
FIG. 8 shows particle size distributions of the whole bean soymilk of Embodiments 1, 4 and Comparative Examples 2 and 3.

As shown in FIG. 8, FIG. 8 shows particle size distributions of the whole bean soymilk of Embodiments 1, 4 and Comparative Examples 2 and 3. As can be seen, the particle size distribution of the whole bean soymilk obtained in Embodiments 1 and 4 is significantly shifted to the left compared to the Comparative Examples 2 and 3, indicating that the high-pressure jet impact chamber structure 17 and the multi-parallel-type convenient pulverizing component adopted with the high-pressure jet impact chamber structure 17 designed by the present disclosure may effectively reduce the particle size of the crushed material and the particle size distribution is narrower.

Specific Embodiments and Comparative Examples are as follows.

Embodiment 1

50 kg of screened and washed dried soybean grains are put into a dynamic high-pressure microfluidizer supply hopper, and 200 kg of water is pumped in through an inlet pump. A first stage of pulverization is carried out first, and the linear velocity of a cutting blade at the first stage of pulverization milling disc is 40 m/s. After pulverization, the material enters into a second stage of pulverization through a pipeline, and the linear velocity of a cutting blade at the second stage of pulverization milling disc is 60 m/s, and crude soymilk can be obtained. The pulverized crude soymilk is pumped into a feed barrel through a centrifugal pump, a feed port is opened, the crude soymilk passes through a self-priming centrifugal pump and a 60-mesh screen and is transported to a three-plunger high-pressure pump. The frequency of the motor is adjusted to 26 HZ, and the crude soymilk is pressurized through the reciprocating movement of the piston. After the liquid pressure gauge shows that the pressure within the high-pressure pump reaches 140 MPa, the high-speed crude soymilk liquid passes through a quadruple type convenient pulverizing component adopted with the high-pressure jet impact chamber of the present disclosure. In each high-pressure jet impact chamber structure 17, the crude soymilk liquid passes through the jet orifice 12 into the pulverizing chamber 13, and is subjected to convection impact, shock, and cavitation in the pulverizing chamber 13, such that the particulate material is ultra-micro pulverized by ultra-high-density energy. Then the soymilk is converged and discharged at the discharge pipe 20. A Malvern laser particle size meter is applied to determine the particle size of the obtained whole bean soymilk liquid, and the result is that the particle size D90 is 35.0 μm. The whole bean soymilk has no soybean odor, and the taste is silky and grain-free.

Comparative Example 2

Comparison tests are conducted according to a patent disclosing a jet impact milling device and a method for whole-component pulping of food (CN application No. 202011281465.0) as a reference, and the following steps are performed in sequence.

50 kg of screened and washed dried soybean grains are put into a dynamic high-pressure microfluidizer supply hopper, and 200 kg of water is pumped in through an inlet pump. A first stage of pulverization is carried out first, and the linear velocity of a cutting blade at the first stage of pulverization milling disc is 40 m/s. After pulverization, the material enters into a second stage of pulverization through a pipeline, and the linear velocity of a cutting blade at the second stage of pulverization milling disc is 60 m/s, and crude soymilk can be obtained. The pulverized crude soymilk is pumped into a feed barrel through a centrifugal pump, a feed port is opened, the crude soymilk passes through a self-priming centrifugal pump and a 60-mesh screen and is transported to a three-plunger high-pressure pump. The frequency of the motor is adjusted to 26 HZ, and the crude soymilk is pressurized through the reciprocating movement of the piston. After the liquid pressure gauge shows that the pressure within the high-pressure pump reaches 140 MPa, the high-speed crude soymilk liquid collides with each other in a specially designed micro-aperture channel, and the whole bean soymilk liquid is ultra-micro pulverized. The inner diameters of the first jet chamber 153 and the second jet chamber 154 inside the micro-aperture channel nozzle are 140 μm and 100 μm, respectively. The particle size of the whole bean soymilk is determined by the Malvern laser particle size meter, and the result is that the particle size D90 is 63.3 μm. The whole bean soymilk liquid is with a thick soybean odor and slightly grainy.

Comparative Example 3

Comparison tests are conducted according to a patent disclosing a high-pressure jet nozzle and a high-pressure jet pulverizing device applying the nozzle (CN application No. 201811461722.1) as a reference, and the following steps are performed in sequence.

50 kg of screened and washed dried soybean grains are put into a dynamic high-pressure microfluidizer supply hopper, and 200 kg of water is pumped in through an inlet pump. A first stage of pulverization is carried out first, and the linear velocity of a cutting blade at the first stage of pulverization milling disc is 40 m/s. After pulverization, the material enters into a second stage of pulverization through a pipeline, and the linear velocity of a cutting blade at the second stage of pulverization milling disc is 60 m/s, and crude soymilk can be obtained. The pulverized crude soymilk is pumped into a feed barrel through a centrifugal pump, a feed port is opened, the crude soymilk passes through a self-priming centrifugal pump and a 60-mesh screen and is transported to a three-plunger high-pressure pump. The frequency of the motor is adjusted to 26 HZ, and the crude soymilk is pressurized through the reciprocating movement of the piston. After the liquid pressure gauge shows that the pressure within the high-pressure pump reaches 140 MPa, the high-speed crude soymilk liquid passes through a buffer chamber 6 for buffering, and is pressurized through a jet channel component to obtain the finished soymilk. The Malvern laser particle size meter is applied to determine the particle size of the whole bean soymilk obtained, and the result is that the particle size D90 is 47.7 μm. The whole bean soybean liquid is with a light soybean odor, the taste is not obvious grainy.

Embodiment 4

50 kg of screened and washed dried soybean grains are put into a dynamic high-pressure microfluidizer supply hopper, and 200 kg of water is pumped in through an inlet pump. A first stage of pulverization is carried out first, and the linear velocity of a cutting blade at the first stage of pulverization milling disc is 40 m/s. After pulverization, the material enters into a second stage of pulverization through a pipeline, and the linear velocity of a cutting blade at the second stage of pulverization milling disc is 60 m/s, and crude soymilk can be obtained. The pulverized crude soymilk is pumped into a feed barrel through a centrifugal pump, a feed port is opened, the crude soymilk passes through a self-priming centrifugal pump and a 60-mesh screen and is transported to a three-plunger high-pressure pump. The frequency of the motor is adjusted to 26 HZ, and the crude soymilk is pressurized through the reciprocating movement of the piston. After the liquid pressure gauge shows that the pressure within the high-pressure pump reaches 140 MPa, the high-speed crude soymilk liquid passes through the high-pressure jet impact chamber 17, with an industrial-grade "single orifice+single pulverizing chamber" design. In the high-pressure jet impact chamber structure, the crude soymilk liquid passes through the jet orifice 12 into the pulverizing chamber 13, and is subjected to convection impact, shock, and cavitation in the pulverizing chamber 13, such that the particulate material is ultra-micro pulverized by ultra-high-density energy. Then the soymilk is converged and discharged at the discharge pipe 20. A Malvern laser particle size meter is applied to determine the particle size of the obtained whole bean soymilk liquid, and the result is that the particle size D90 is 33.9 μm. The whole bean soymilk has no obvious soybean odor, and the taste is silky and grain-free.

Embodiment 5

The screened and washed dried soybean grains and water are put into a dynamic high-pressure microfluidizer with a material-liquid ratio of 1:4, where the soybeans are added through a supply hopper, and the water is pumped in through an inlet pump. A first stage of pulverization is carried out first, and the linear velocity of a cutting blade at the first stage of pulverization milling disc is 40 m/s. After pulverization, the material enters into a second stage of pulverization through a pipeline, and the linear velocity of a cutting blade at the second stage of pulverization milling disc is 60 m/s, and crude soymilk can be obtained. The pulverized crude soymilk is pumped into a feed barrel through a centrifugal pump, a feed port is opened, the crude soymilk passes through a self-priming centrifugal pump and a 60-mesh screen and is transported to a three-plunger high-pressure pump. The frequency of the motor is adjusted to 26 HZ, and the crude soymilk is pressurized through the reciprocating movement of the piston. After the liquid pressure gauge shows that the pressure within the high-pressure pump reaches 140 MPa, the high-speed crude soymilk liquid passes through a quadruple type convenient pulverizing component adopted with the high-pressure jet impact chamber of the present disclosure. In each high-pressure jet impact chamber structure 17, the crude soymilk liquid passes through the jet orifice 12 into the pulverizing chamber 13, and is subjected to convection impact, shock, and cavitation in the pulverizing chamber 13, such that the particulate material is ultra-micro pulverized by ultra-high-density energy. Then the soymilk is converged and discharged at the discharge pipe 20. After normal operation of the device is caused to run continuously for 48 h, and samples are taken every 4 h to measure the particle size of the whole soybean pulp liquid. A Malvern laser particle size meter is applied to determine the particle size of the obtained whole bean soymilk liquid, and the result is shown in Table 1. It can be seen that the particle size D90 are all less than 40 μm. The production capacity of up to 6,000 L/h. The whole bean soymilk has no soybean odor, and the taste is silky and grain-free. After the high-pressure jet impact chamber structure 17 is disassembled and inspected, the nozzle orifice and the surface of the pulverizing chamber have no obvious textures.

Sensory Quality

Performance test of the whole bean soymilk in Embodiments 1, 4, 5 and Comparative Examples 2 and 3:

The whole bean soymilk obtained in Embodiment 1 has a particle size D90 of 35.0 μm, with no soybean odor and a silky and grain-free taste.

The whole bean soymilk obtained in Comparative Example 2 has a particle size D90 of 63.3 μm, with a strong soybean odor and a slightly grainy taste.

The whole bean soymilk obtained in Comparative Example 3 has a particle size D90 of 47.7 μm, with a light soybean odor and no obviously grainy taste.

The whole bean soymilk obtained in Embodiment 4 has a particle size D90 of 33.9 μm, with no obvious soybean odor and a silky and grain-free taste.

The whole bean soymilk obtained in Embodiment 5 has a particle size D90 shown in the table below, which is less than 40 μm, with no soybean odor and a silky and grain-free taste.

TABLE 1

Particle size of whole bean soymilk from 0-48 h

| Time | 0 h | 4 h | 8 h | 12 h | 16 h | 20 h | 24 h |
|---|---|---|---|---|---|---|---|
| D90 | 35.1 μm | 34.8 μm | 32.6 μm | 35.0 μm | 33.3 μm | 36.3 μm | 34.5 μm |
| Time | 28 h | 32 h | 36 h | 40 h | 44 h | 48 h | / |
| D90 | 34.7 μm | 35.6 μm | 37.4 μm | 32.1 μm | 33.3 μm | 35.4 μm | / |

It can be seen that the particle size of the whole bean soymilk prepared in Embodiments 1, 4, and 5 are all less than 40 μm, with no soybean odor and a silky, grain-free taste. In addition, it can be seen from Embodiment 5, due to the jet impact chamber being adopted with the pulverizing chamber of diamond material and 304 stainless steel shell, the hardness of the components is improved, making the surface of the orifice and the pulverizing chamber have no obvious traces under the chamber in industrial-grade mass production after 48 h of continuous operation. The multi-parallel type convenient pulverizing component adopted with the high-pressure jet impact chamber structure operates stably, such that the efficiency of the work is improved, and the size of the crushed material is reduced.

It should be noted that: the above embodiments are only intended to illustrate rather than limit the technical solutions of the present disclosure. Although the present disclosure is described in detailed with reference to the above embodiments, those skilled in the art should understand: the present disclosure still can be subjected to modification or equivalent replacement, and that any modification or partial replacement without departing from the spirit and scope of the present disclosure should be covered by the scope of the claims of the present disclosure.

What is claimed is:

1. A high-pressure jet impact chamber structure, comprising a body (11); wherein both ends of the body (11) along a length direction are an upstream end and a downstream end; an opening of the upstream end is configured to connect a supply portion, and an opening of the downstream end is configured to connect a discharge portion; a chamber is defined in the body (11) extending along the length direction and running through the upstream end and the downstream end; the chamber comprises a jet aperture (12) disposed at the upstream end and a pulverizing chamber (13) disposed at the downstream end that are in communication with each other; a flow size of the jet aperture (12) is the same as or smaller than a flow size of the pulverizing chamber (13); the pulverizing chamber (13) comprises a first inlet disposed at the upstream end and a first outlet disposed at the downstream end; a flow size of the pulverizing chamber (13) increases sequentially from the first inlet to the first outlet; an inner wall surface of the pulverizing chamber (13) is formed with a pulverizing portion for pulverizing; and wherein the pulverizing chamber (13) is of a rotary structure; the pulverizing portion comprises a plurality of protruding conical surfaces formed from the first inlet to the first outlet; a section of the pulverizing chamber (13) is serrated, and a chamfer is arranged at each of the first inlet and the first outlet.

2. The high-pressure jet impact chamber structure according to claim 1, wherein the jet orifice (12) has a circular cross-section and has an inner diameter of 6-16 mm.

3. The high-pressure jet impact chamber structure according to claim 1, wherein the pulverizing chamber (13) has an inner diameter of 6-16 mm.

4. The high-pressure jet impact chamber structure according to claim 1, wherein an axis of the jet orifice (12) is located in a same line with an axis of the pulverizing chamber (13).

5. The high-pressure jet impact chamber structure according to claim 1, wherein the body (11) is arranged with a first external thread on an outer side wall adjacent to the upstream end and with a second external thread on an outer side wall adjacent to the downstream end.

6. The high-pressure jet impact chamber structure according to claim 1, wherein the body (11) is made of 304 stainless steel, and the pulverizing portion is made of diamond.

7. A multi-parallel type convenient pulverizing component, comprising a plurality of the high-pressure jet impact chamber structures according to claim 1, and the supply portion and the discharge portion; wherein the supply portion has a supply chamber, the supply chamber being connected to an opening at the upstream end of each high-pressure jet impact chamber structure (17); the discharge portion has a discharge chamber, the discharge chamber being connected to an opening at the downstream end of each high pressure jet impact chamber structure (17).

8. The multi-parallel type convenient pulverizing component according to claim 7, wherein the supply portion comprises a multi-parallel type chassis (15) and a multi-parallel type connector disk (16) that are docked together to enclose the supply chamber; the multi-parallel type connector disk (16) defines a plurality of though holes, and a number of the plurality of though holes is the same as a number of the plurality of high-pressure jet impact chamber structures (17); the plurality of though holes are in communication with the supply chamber and with the openings at the upstream ends of the plurality of high-pressure jet impact chamber structures (17); the multi-parallel type chassis (15) defines a docking hole in communication with the supply chamber and to a supply pipe (21); an end of the feed pipe (21) away from the docking hole is connected to a high-pressure pump output pipe (14);

the discharge portion comprises a sealing end cover (18) and a discharge disk (19) that are sealed and docked to each other to enclose the discharge chamber; the sealing end cover (18) defines a plurality of through holes, and a number of the plurality of though holes is the same as a number of the plurality of high-pressure jet impact chamber structures (17); the plurality of though holes are in communication with the discharge chamber and with the openings at the downstream ends of the plurality of high-pressure jet impact chamber structures (17); the discharge disk (19) defines a perforation, and an inner diameter of the perforation is the same as an inner diameter of the discharge chamber; the perforation is connected to a discharge pipe (20).

9. The multi-parallel type convenient pulverizing component according to claim 8, wherein the discharge pipe (20) is in a shape of a circular terrace with two ends of different diameters; one of the two ends with a greater diameter is docked to the perforation.

10. The multi-parallel type convenient pulverizing component according to claim 7, wherein the jet orifice (12) has a circular cross-section and has an inner diameter of 6-16 mm.

11. The multi-parallel type convenient pulverizing component according to claim 7, wherein the pulverizing chamber (13) has an inner diameter of 6-16 mm.

12. The multi-parallel type convenient pulverizing component according to claim 7, wherein an axis of the jet orifice (12) is located in a same line with an axis of the pulverizing chamber (13).

13. The multi-parallel type convenient pulverizing component according to claim 7, wherein the body (11) is arranged with a first external thread on an outer side wall adjacent to the upstream end and with a second external thread on an outer side wall adjacent to the downstream end.

14. The multi-parallel type convenient pulverizing component according to claim 7, wherein the body (11) is made of 304 stainless steel, and the pulverizing portion is made of diamond.

* * * * *